(12) United States Patent
Rehman

(10) Patent No.: US 8,330,770 B2
(45) Date of Patent: Dec. 11, 2012

(54) SYSTEM AND METHOD FOR IMPROVING THE QUALITY OF HALFTONE VIDEO USING AN ADAPTIVE THRESHOLD

(75) Inventor: Hamood-Ur Rehman, Austin, TX (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 150 days.

(21) Appl. No.: 12/794,648

(22) Filed: Jun. 4, 2010

(65) Prior Publication Data

US 2011/0032417 A1 Feb. 10, 2011

Related U.S. Application Data

(63) Continuation of application No. PCT/US2010/037315, filed on Jun. 3, 2010.

(60) Provisional application No. 61/184,537, filed on Jun. 5, 2009.

(51) Int. Cl.
*G09G 5/02* (2006.01)
(52) U.S. Cl. ...................................... 345/596
(58) Field of Classification Search .............. 345/596, 345/89
See application file for complete search history.

(56) References Cited

U.S. PATENT DOCUMENTS

| | | | |
|---|---|---|---|
| 4,709,995 A | 12/1987 | Kuribayashi et al. | |
| 4,954,789 A | 9/1990 | Sampsell | |
| 4,982,184 A | 1/1991 | Kirkwood | |
| 5,068,649 A | 11/1991 | Garrett | |
| 5,280,277 A | 1/1994 | Hornbeck | |
| 5,475,397 A | 12/1995 | Saidi | |
| 5,548,301 A | 8/1996 | Kornher et al. | |
| 5,589,852 A | 12/1996 | Thompson et al. | |
| 5,784,189 A | 7/1998 | Bozler et al. | |
| 5,790,548 A | 8/1998 | Sistanizadeh et al. | |
| 6,040,937 A | 3/2000 | Miles | |
| 6,232,936 B1 | 5/2001 | Gove et al. | |
| 6,429,601 B1 | 8/2002 | Friend et al. | |
| 6,480,177 B2 | 11/2002 | Doherty et al. | |

(Continued)

FOREIGN PATENT DOCUMENTS
EP 0 467 048 1/1992
(Continued)

OTHER PUBLICATIONS

Chao-Yong Hsu, CHun-Shien Lu and Soo-Chang Pei, Video Halftoning Preserving Temporal Consistency, Jul. 2007, Multimedia and Expo IEEE International Conference, pp. 1938-1941.*

(Continued)

*Primary Examiner* — Hau Nguyen
*Assistant Examiner* — Leon T Cain, II
(74) *Attorney, Agent, or Firm* — Knobbe Martens Olson & Bear LLP

(57) ABSTRACT

A system and method for processing video data are disclosed. In one aspect, a method includes generating halftone data for a first video frame and generating halftone data for a second video frame. The method further includes, to reduce at least one visual artifact, selectively copying the halftone data for the first video frame into the halftone data for the second video frame, the selectively copying being based upon a comparison between an adaptive threshold and the change resulting due to the copying of the data, in the human visual system model-based perceptual error of the halftone data for the second video frame.

20 Claims, 5 Drawing Sheets

U.S. PATENT DOCUMENTS

| | | |
|---|---|---|
| 6,574,033 B1 | 6/2003 | Chui et al. |
| 6,633,306 B1 | 10/2003 | Marz et al. |
| 6,636,187 B2 | 10/2003 | Tajima et al. |
| 6,674,562 B1 | 1/2004 | Miles et al. |
| 6,680,792 B2 | 1/2004 | Miles |
| 6,741,384 B1 | 5/2004 | Martin et al. |
| 7,123,216 B1 | 10/2006 | Miles |
| 7,142,346 B2 | 11/2006 | Chui et al. |
| 7,161,728 B2 | 1/2007 | Sampsell et al. |
| 7,242,512 B2 | 7/2007 | Chui et al. |
| 7,327,510 B2 | 2/2008 | Cummings et al. |
| 7,388,697 B2 | 6/2008 | Chui et al. |
| 7,403,180 B1 | 7/2008 | Silverstein et al. |
| 7,489,428 B2 | 2/2009 | Sampsell et al. |
| 7,545,554 B2 | 6/2009 | Chui et al. |
| 7,777,715 B2 | 8/2010 | Chui et al. |
| 7,782,525 B2 | 8/2010 | Sampsell et al. |
| 7,864,402 B2 | 1/2011 | Chui et al. |
| 7,952,545 B2 * | 5/2011 | Benjamin et al. ............... 345/87 |
| 8,040,338 B2 | 10/2011 | Chui et al. |
| 2004/0021658 A1 | 2/2004 | Chen |
| 2005/0094211 A1 * | 5/2005 | Dang ........................ 358/3.03 |
| 2005/0157791 A1 | 7/2005 | Sun |
| 2005/0185003 A1 | 8/2005 | Dedene et al. |
| 2005/0259877 A1 * | 11/2005 | Wang et al. .................. 382/236 |
| 2006/0114542 A1 | 6/2006 | Bloom |
| 2006/0119613 A1 | 6/2006 | Kerofsky |
| 2007/0086078 A1 | 4/2007 | Hagood et al. |
| 2007/0153025 A1 * | 7/2007 | Mitchell et al. ............... 345/690 |
| 2008/0266333 A1 | 10/2008 | Silverstein et al. |
| 2009/0201318 A1 | 8/2009 | Silverstein et al. |
| 2011/0032427 A1 | 2/2011 | Rehman et al. |
| 2011/0075247 A1 | 3/2011 | Chui et al. |

FOREIGN PATENT DOCUMENTS

| | | |
|---|---|---|
| EP | 1 258 860 | 11/2002 |
| JP | 2002 062493 | 2/2002 |
| KR | 2003 0030470 | 4/2003 |
| WO | WO 03/044765 | 5/2003 |

OTHER PUBLICATIONS

Brown et al., Sep. 14, 2003, Fast halftoning of MPEG video for bi-tonal displays, Proceedings 2003 International Conference on Image Processing, pp. 445-448.

Damera-Venkata et al., Jan. 2001, Adaptive threshold modulation for error diffusion halftoning, IEEE Transactions on Image Processing 10(1):104-116.

Gotsman, 1993, Halftoning of image sequences, The Visual Computer, 9:255-266.

Hsu et al., Oct. 12, 2008, Compression of halftone video for electronic paper, IEEE International Conference on Image Processing, pp. 1600-1603.

Lieberman et al., 1997, Efficient model based halftoning using direct binary search, IEEE, pp. 775-778.

Miles, MEMS-based interferometric modulator for display applications, Part of the SPIE Conference on Micromachined Devices and Components, 3876:20-28 (1999).

Miles et al., 2000, 5.3: Digital Paper™: Reflective displays using interferometric modulation, SID Digest, vol. XXXI, pp. 32-35.

Sun, Mar. 18, 2005, A method to generate halftone video, IEEE International Conference on Acoustics, Speech, and Signal Processing, 2:565-568.

Sun, Mar. 2006, Video halftoning, IEEE Transactions on Image Processing 15(3):678-686.

ISR and WO dated Sep. 17, 2010 in PCT/10/037315.
IPRP dated Dec. 15, 2011 in PCT/10/037315.

* cited by examiner

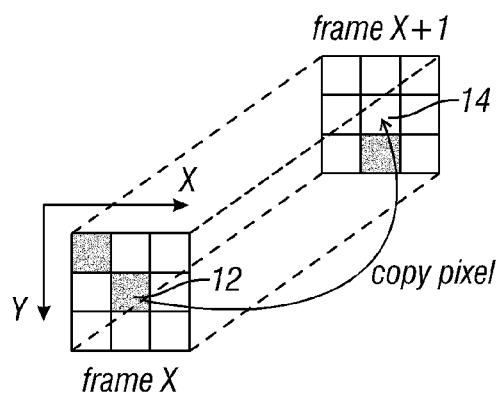
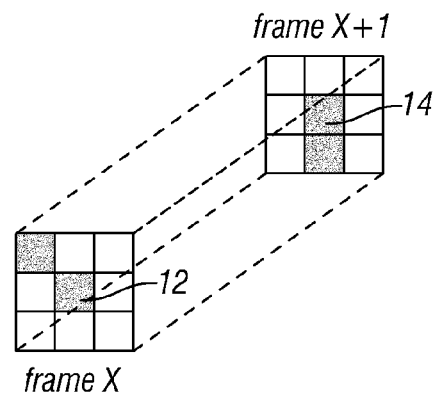
FIG. 1A  FIG. 1B
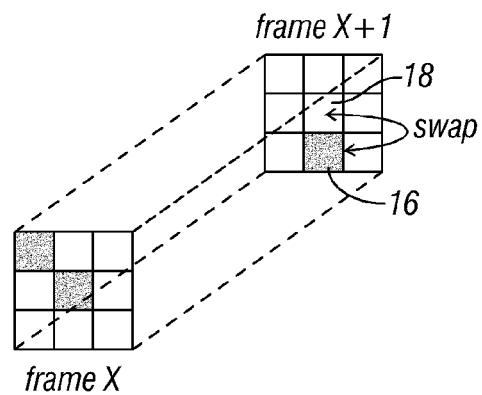
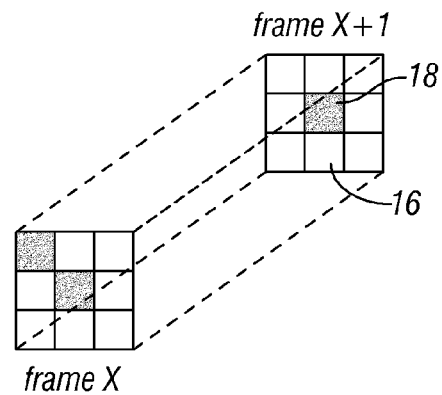
FIG. 2A  FIG. 2B

SYSTEM AND METHOD FOR IMPROVING THE QUALITY OF HALFTONE VIDEO USING AN ADAPTIVE THRESHOLD

CROSS REFERENCE TO RELATED APPLICATIONS

This application is a continuation of PCT Application No. PCT/US10/37315, filed Jun. 3, 2010, which claims priority under 35 U.S.C. Section 119(e) to U.S. Provisional Application No. 61/184,537 filed on Jun. 5, 2009. This application claims priority under 35 U.S.C. Section 119(e) to U.S. Provisional Application No. 61/184,537 filed on Jun. 5, 2009. This application is related to U.S. application Ser. No. 12/794,675, filed concurrently herewith and titled "SYSTEM AND METHOD FOR IMPROVING THE QUALITY OF HALFTONE VIDEO USING A FIXED THRESHOLD." Each of the above applications is incorporated by reference hereby in its entirety.

BACKGROUND OF THE INVENTION

1. Field of the Invention

The field of the invention relates to image processing.

2. Description of the Related Technology

Halftoning is a technique that transforms continuous-tone images into binary images. When a continuous-tone video stream needs to be shown on a binary display, a halftone video may be produced by halftoning each frame in the video stream independently. However, this process results in artifacts including flicker, i.e., an artifact between frames that occurs on the display at low refresh rates. Therefore, it is desirable to have a system and method for reducing artifacts in the halftone video thus improving the quality of the video.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one aspect, a method of processing video data is disclosed. The method comprises generating halftone data for a first video frame and generating halftone data for a second video frame. The method further comprises, to reduce at least one visual artifact, selectively copying the halftone data for the first video frame into the halftone data for the second video frame, the selectively copying being based upon a comparison between an adaptive threshold and the change resulting due to the copying of the data, in the human visual system model based perceptual error of the halftone data for the second video frame.

In another aspect, an apparatus for processing video data is disclosed. The apparatus comprises a memory device having stored therein at least halftone data for a first and second video frame. The apparatus further comprises a processor that is configured to communicate with said memory device and is configured to reduce at least one visual artifact by selectively copying the halftone data for the first video frame into the halftone data for the second video frame, the selectively copying being based upon a comparison between an adaptive threshold and the change, resulting due to this copying of the data, in the human visual system model based perceptual error of the halftone data for the second video frame.

In another aspect, an apparatus for processing video data is disclosed. The apparatus comprises means for generating halftone data for a first video frame and means for generating halftone data for a second video frame. The apparatus further comprises means for reducing at least one visual artifact by selectively copying the halftone data for the first video frame into the halftone data for the second video frame, the selectively copying being based upon a comparison between an adaptive threshold and the change, resulting due to the copying of the data, in the human visual system model based perceptual error of the halftone data for the second video frame.

BRIEF DESCRIPTION OF THE DRAWINGS

FIGS. 1A and 1B are diagrams illustrating one embodiment of a method of processing halftone video frames to reduce halftone video artifacts.

FIGS. 2A-2B are diagrams illustrating a different embodiment of a method of processing halftone video frames to reduce halftone video artifacts.

DETAILED DESCRIPTION OF CERTAIN EMBODIMENTS

Figure 3:
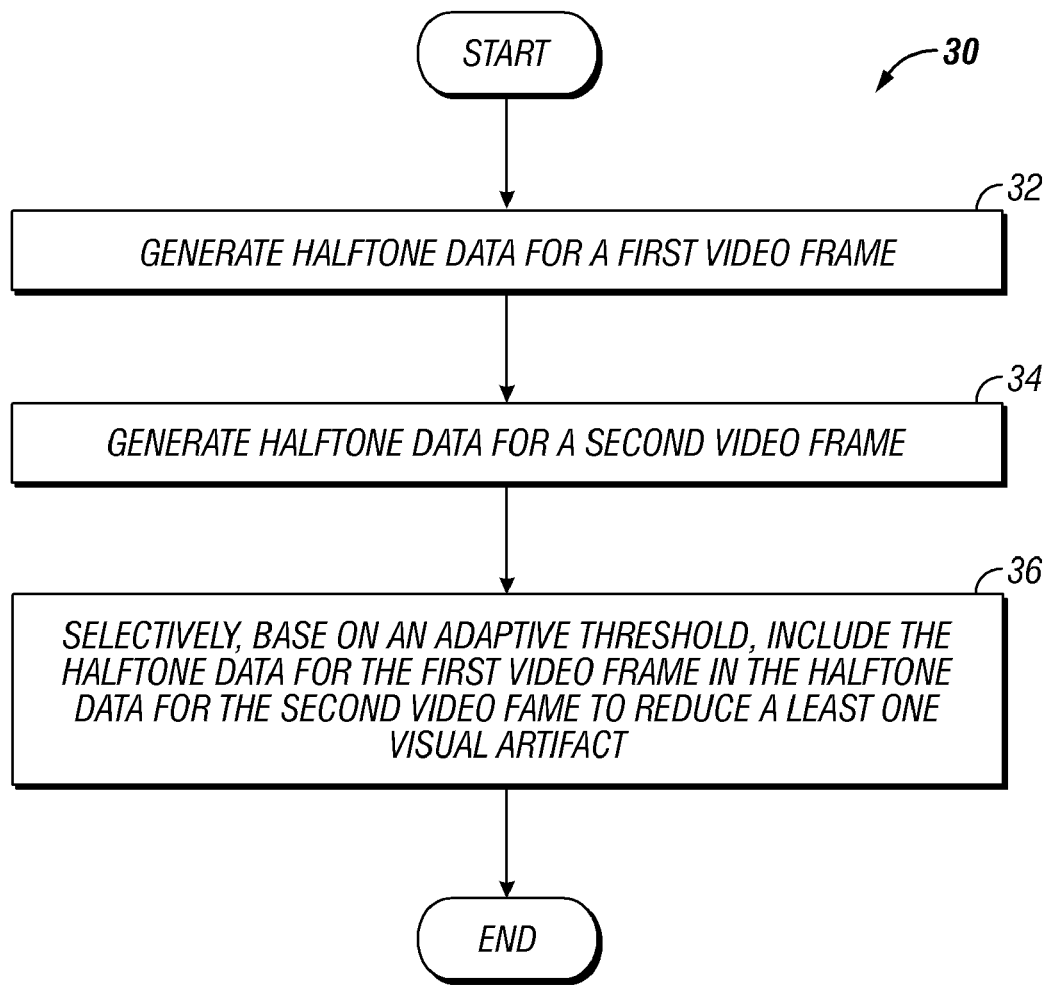
FIG. 3 is a flowchart illustrating one embodiment of a method of processing halftone video frames to reduce halftone video artifacts.

The following detailed description is directed to certain specific embodiments of the invention. However, the invention can be embodied in a multitude of different ways. In this description, reference is made to the drawings wherein like parts are designated with like numerals throughout.

Certain embodiments as will be described below relate to a system and method of processing video data. In one embodiment, a halftone video stream including a sequence of frames is processed to reduce halftone video artifacts under the constraint that the perceptual error between each frame of halftone video and the corresponding frame of continuous-tone video satisfies a criterion. This ensures artifact reduction while preserving the quality of the video. The perceptual error may be estimated based on a human visual system model. Any human visual system model may be used. The perceptual error between a halftone video frame and the corresponding continuous-tone video frame may also be referred to as "the perceptual error of the halftone video frame."

In one embodiment, the method comprises generating halftone data for a first video frame and generating halftone data for a second video frame. The method further comprises, to reduce at least one visual artifact, selectively copying the halftone data for the first video frame into the halftone data for the second video frame, the selectively copying being based upon a comparison between an adaptive threshold and the change resulting due to the copying of the data, in the human visual system model based perceptual error of the halftone data for the second video frame.

FIGS. 1A and 1B are diagrams illustrating one embodiment of a method of processing halftone video frames to reduce halftone video artifacts. The halftone frames includes a sequence of video frames such as frame X and the next frame in sequence X+1. In one embodiment, the halftone frames are generated by halftoning each frame of the continuous-tone video independently.

In the exemplary embodiment, the method receives a halftone video stream. In another embodiment, the method receives a continuous tone video stream and generate the halftone video stream by halftoning each frame of the continuous-tone video independently.

Each frame includes a set of pixels. Each pixel is referred to by its spatial coordinates (x,y) within the frame. x and y are the horizontal and vertical coordinates as shown. In the exemplary embodiment, the pixel 12 of the frame X may be referred as pixel (1,1). The pixel 14 is at the corresponding location in the frame X+1. In other words, the pixel 14 in the frame X+1 and the pixel 12 in the frame X have the same spatial coordinates in their respective frames. In one embodiment, each pixel may be of one of two values representing bright or dark state when being rendered on a display. A pixel is drawn as a dark box or a white box depending on its pixel value. In FIG. 1A, the pixel 12 has a value representing dark state while the pixel 14 has a value representing bright state.

The halftone frames are duplicated into an output video stream, which is then processed to reduce the halftone artifact. FIG. 1A shows the output video frames X and X+1 before a trial change is made to the pixel 14 in the frame X+1. FIG. 1B shows the output video frames X and X+1 after a trial change is made to the pixel 14 in the frame X+1.

As a part of the process of reducing the halftone artifact, a trial change is made to the pixel 14 in the frame X+1 by copying the value of the pixel 12 in the frame X into the pixel 14 in the frame X+1. After the trial change, FIG. 1B shows that the pixel 14 of the frame X+1 has the same value as the pixel 12 of the frame X. Such trial change could reduce the video artifact such as flickering in the output video stream by improving consistency between neighboring frames.

In one embodiment, to preserve the quality of the output video, a check is then run to ensure that the difference between the perceptual error of the originally generated halftone data for the output video frame X+1 and the perceptual error of the output video frame X+1 after the change, i.e., the frame X+1 shown in FIG. 1B, satisfies a criterion. If the criterion is met, the change to the frame X+1 is kept. Otherwise, the pixel 14 of the frame X+1 is restored to its previous value.

In one embodiment as will be described in regard to FIG. 4, the check is run by comparing, the change in the perceptual error of the halftone video frame X+1 due to the trial change, and an adaptive threshold. The trial change is kept if the change in the perceptual error does not exceed the adaptive threshold.

In one embodiment, all pixels in the frame X+1 are checked in a particular order to see if a value of the corresponding pixel in the frame X should be copied to that pixel, following the same process as described above with regard to the pixel 14. Also, all frames in the output video stream are subject to the same process as described here with regard to the frame X+1.

In the exemplary embodiment, data from a frame X of the output video stream is selectively copied into the next frame X+1 of the output video stream. In another embodiment, data from a frame X of the output video stream may be selectively copied into the frame X−1 of the output video stream, i.e., the frame immediately before the frame X.

In the exemplary embodiment, the value of the pixel (1,1) of a frame X of the output video stream is selectively copied into a pixel of the same spatial coordinates in a neighboring frame of the output video stream.

FIGS. 2A-2B are diagrams illustrating a different embodiment of a method of processing halftone video frames to reduce halftone video artifacts. This embodiment is similar to the embodiment shown in FIG. 1, except when noted otherwise below. FIG. 2A shows the output video frames X and X+1 before a trial change is made to the pixel 18 in the frame X+1. FIG. 2B shows the output video frames X and X+1 after a trial change is made to the pixel 18 in the frame X+1.

As a part of the process of reducing the halftone artifact, the value of the pixel 18 of the frame X+1 of the output video streams is swapped with the value of a neighboring pixel, e.g., the pixel 16 in the same frame as shown. The trial change thus changes the value of the pixel 18 as well as the pixel 16.

In the above FIGS. 1A-2B the principle of various embodiments of a method of processing halftone video frames to reduce halftone video artifacts has been described. Certain exemplary flowcharts will be presented below to illustrate these methods. For illustration purpose, these flowcharts are using the embodiment shown in FIG. 1 as an example, but these flowcharts should not be limited to the method of FIG. 1 only.

FIG. 3 is a flowchart illustrating one embodiment of a method of processing halftone video frames to reduce halftone video artifacts. Depending on the embodiment, certain steps of the method may be removed, merged together, or rearranged in order. The method 30 starts at a block 32, wherein halftone data is generated for a first video frame of a continuous tone video stream. The halftone data may be generated by halftoning the first video frame independently.

The method then moves to a block 34, wherein halftone data is generated for a second video frame of the continuous tone video stream. The halftone data may be generated by halftoning the second video frame independently. The first and the second video frames are next to each other in the continuous tone video stream.

Next, at a block 36, the method selectively, based on an adaptive threshold, includes the halftone data for the first video frame in the halftone data in the second video frame to reduce at least one visual artifact. In one embodiment, the method selectively copies a pixel of the halftone data for the first video frame into the corresponding pixel of the halftone data for the second video frame, if a criterion is met.

As will be further described below in regard to FIG. 4, the selective copying is made if the change in the perceptual error of the second halftone video frame due to the selective copying does not exceed an adaptive threshold. Particularly, the method selectively copies the halftone data for the first video frame into the halftone data for the second video frame wherein the selectively copying is based upon a comparison between an adaptive threshold and the change, resulting due to this copying of the data, in the human visual system model based perceptual error.

In one embodiment, the method may receive the continuous tone video stream and the halftone video stream as input. In that case, the block 34 may be removed.

Figure 4:
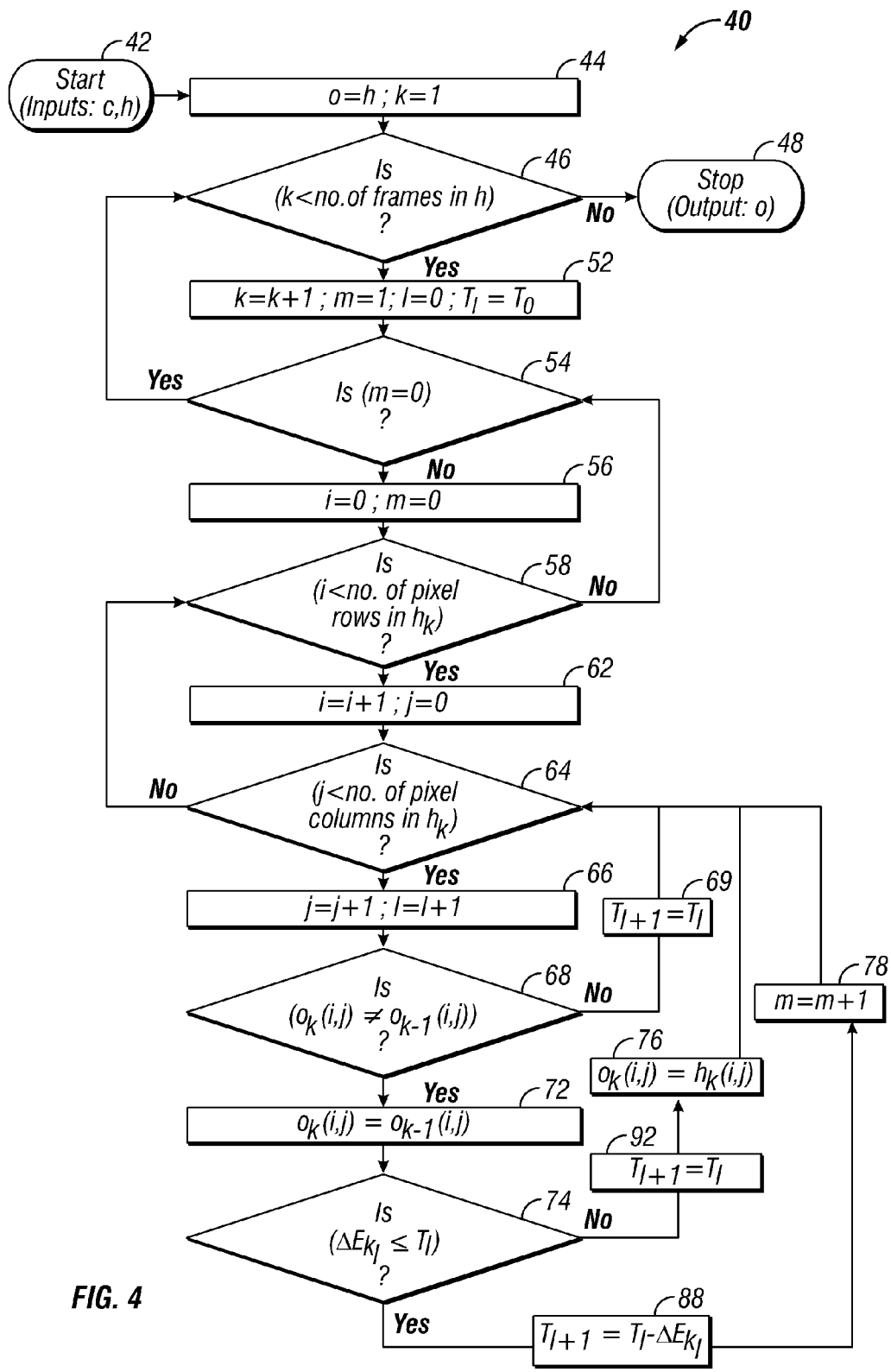
FIG. 4 is a flowchart illustrating one embodiment of a method of processing halftone video frames to reduce halftone video artifacts.

FIG. 4 is a flowchart illustrating one embodiment of a method of processing halftone video frames to reduce halftone video artifacts. Depending on the embodiment, certain steps of the method may be removed, merged together, or rearranged in order. In the exemplary embodiment, the steps below may be performed by a processor which may be any suitable general purpose single- or multi-chip microprocessor, or any suitable special purpose microprocessor such as a digital signal processor, microcontroller, or a programmable gate array.

The method 40 starts at a block 42, wherein a continuous tone video stream "c" and a halftone video stream "h" are received. The continuous tone video stream c includes a sequence of video frames. The halftone video stream h is the halftone data of the continuous tone video stream c. In one embodiment, the halftone video stream h is produced by halftoning each frame in the continuous tone video stream c independently.

The method then moves to a block 44, wherein an output video stream "o" is generated. It is noted that though the video stream o is called an output video stream, it is for convenience of description. The video stream o is not sent out for display or further processing until the completion of the method 40. The output video stream is the duplicate of the halftone video stream h. A variable "k" is originally set to 1. The variable k is used to indicate which frame in the output video stream is currently under process.

Next, at a decision block 46, the variable k is compared with the number of frames in the halftone video stream h. If the value of k is no less than the number of frames in the halftone video stream h, then all frames have been processed. The method moves to a block 48, in which the method stops and the output video stream o is provided for further image processing or provided to a display for rendering.

Referring again to the decision block 46, if it is determined that the variable k is less than the number of frames in the halftone video stream h, the method moves to a block 52, in which k is increased by 1. At the block 52, a variable "m" is originally set to 1. The variable m is used to indicate how many pixels were copied in one round in which each pixel of the frame k is checked, i.e., in blocks 56-92. In the exemplary embodiment, the variable m is used as an indicator of whether the current frame k has converged to a solution such that the method may move to the next frame. Also, a new variable l is introduced with its value initially set to 0. The variable l is used to track the number of visits to, i.e., tests of pixels of the current frame, i.e., the Kth frame. An adaptive threshold value $T_1$ is introduced. The threshold $T_1$ is initialized to an initial value $T_0$.

Next, at a decision block 54, it is determined whether m equals 0. If m does equal 0, it is determined that no pixel is copied in one round in which each pixel of the frame k is checked. Since no pixel is copied, the method moves to block 46 to process the next frame in the output video stream.

If m does not equal 0, the method then moves to a block 56. At this block, a variable "i" is originally set to 0. The variable i is used to indicate the row coordinate of a pixel currently under process. The variable m is also assigned the value 0.

Moving to a decision block 58, the variable i is compared with the number of rows in the halftone video frame $h_k$. If the variable i is not less than the number of rows in the halftone video frame $h_k$, then all rows in this frame have been processed, and the method moves to the decision block 54.

Returning again to the decision block 58, if it is determined that the variable i is less than the number of rows in the halftone video frame $h_k$, the method moves to a block 62, wherein i is increased by 1 so the method starts processing pixels in the next row. At block 62, a variable "j" is originally set to 0. The variable j is used to indicate the column coordinate of a pixel currently under process.

Moving to a decision block 64, wherein the variable j is compared with the number of columns in the halftone video frame $h_k$. If the variable j is no less than the number of columns in the halftone video frame $h_k$, then all pixels in row i have been processed. The method moves to the decision block 58. If the variable j is less than the number of columns in the halftone video frame $h_k$, then the method moves to a block 66.

At block 66, j is increased by 1 so that the next pixel in row i is under process. The variable l is increased by 1 as the method moves to visit the next pixel.

Next, at a decision block 68, the pixel (i,j) of the kth video frame in the output video stream, which is referred to as $o_k(i,j)$ is processed. The value of the pixel $o_k(i,j)$ is compared to the value of the pixel (i,j) of the (k−1)th frame in the output video frame $o_{k-1}$, which is referred to as $o_{k-1}(i,j)$. The (k−1)th frame is the frame immediately before the kth frame in the output video stream.

If the pixel $o_k(i,j)$ and the pixel $o_{k-1}(i,j)$ have the same value, then the method moves to a block 69, wherein the threshold value $T_{l+1}$ used for the visit of the next pixel remains the same as the current threshold value $T_l$. Subsequently, the method moves to the decision block 64 to process the next pixel.

If the pixel $o_k(i,j)$ and the pixel $o_{k-1}(i,j)$ do not have the same value, then the method moves to block 72, wherein the value of the pixel $o_{k-1}(i,j)$ is copied into the pixel $o_k(i,j)$ for a trial.

Next at a decision block 74, the method evaluates the effect of the trial change made in block 72 so as to decide whether the trial change should be accepted. In the exemplary embodiment, the method determines whether $\Delta E_{k_j}$ is within an adaptive threshold value $T_l$. As will be further explained below, $\Delta E_{k_j}$ represents the change in the perceptual error of the halftone video frame due to the trial change.

The method then moves to either a block 88 or the block 92, depending on the answer to the inquiry at the decision block 86, to generate the threshold value $T_{l+1}$ used for the visit of the next pixel.

If the answer to the inquiry at block 86 is yes, then the trial change is accepted. The method moves to a block 88, wherein $T_{l+1}=T_l-\Delta E_{k_j}$. Next at a block 78, the variable m is increased by 1 to indicate that one more pixel copying is made. The method then moves to the decision block 64 to process the next pixel.

If the answer to the inquiry at block 86 is no, then the trial change is not accepted. The method moves to a block 92, wherein the threshold value $T_{l+1}$ used for the visit of the next pixel remains the same as the current threshold value $T_l$. Next at a block 76, the value of the pixel $o_k(i,j)$ is set back to the value of the pixel $h_k(i,j)$, which is the pixel (i,j) of the kth frame in the halftone video stream. The method then moves to the decision block 64 to process the next pixel.

In the exemplary embodiment, the method evaluates the effect of each trial change based on $\Delta E_{kj}$, which represents the change in the perceptual error of the halftone video frame due to the trial change. The perceptual error indicates the difference between the halftone video frame and the continuous-tone video frame as perceived by human vision. Such perceptual error may be calculated based on a model for human visual system (HVS). Any suitable human visual system model may be used.

For the $k^{th}$ halftone frame, $h_k$, the corresponding $k^{th}$ error frame is denoted $e_{hc,k}$, with its each pixel $e_{hc,k}(i,j)$ defined by $$e_{hc,k}(i,j)=c_k(i,j)-h_k(i,j) \quad \text{Equation 1}$$

The corresponding $k^{th}$ perceived error frame $\tilde{e}_{hc,k}$ is then defined as $$\tilde{e}_{hc,k}=e_{hc,k}*\tilde{p} \quad \text{Equation 2}$$

Here * indicates 2-dimensional convolution, and $\tilde{p}$ is a point spread function representing a model of the human visual system. In the exemplary embodiment, the point spread function is determined by a luminance spatial frequency response function as proposed by R. Nasanen, "Visibility of halftone dot textures", *IEEE Trans. Syst. Man. Cyb.*, vol. 14, no. 6, pp. 920-924, 1984. However, other human visual system models may also be used.

The perceptual error between $h_k$ and $c_k$ is defined as $$E_{hc,k} \equiv \sum_{i=1}^{M}\sum_{j=1}^{N} \tilde{e}_{hc,k}^2 \qquad \text{Equation 3}$$

Similarly, for the $k^{th}$ output frame, $o_k$, the corresponding $k^{th}$ error frame is denoted $o_{hc,k}$, with its each pixel $o_{hc,k}(i,j)$ defined by $$o_{hc,k}(i,j) = c_k(i,j) - o_k(i,j) \qquad \text{Equation 4}$$

The corresponding $k^{th}$, perceived error frame $\tilde{e}_{oc,k}$ is then defined as $$\tilde{e}_{oc,k} = e_{oc,k} * \tilde{p} \qquad \text{Equation 5}$$

the perceptual error between $o_k$ and $c_k$ is defined as $$E_{oc,k} \equiv \sum_{i=1}^{M}\sum_{j=1}^{N} \tilde{e}_{oc,k}^2 \qquad \text{Equation 6}$$

The change in the perceptual error of the halftone video frame due to the trial change, as represented by $\Delta E_{k_l}$, may be determined in the following Equations.

$$\Delta E_{k_l} = E_{oc,k_l} - E_{hc,k} \text{ for } l=1 \qquad \text{Equation 7}$$

$$\Delta E_{k_l} = E_{oc,k_{l-1}} \text{ for otherwise} \qquad \text{Equation 8}$$

Wherein M is the number of rows and N is the number of columns in the current frame K. $E_{hc,k}$ is as defined in Equation 3. $E_{oc,k_{l-1}}$ represents the perceptual error between the output frame $o_{k_{l-1}}$ and $c_k$ and $E_{oc,k_l}$ represents the perceptual error between the output frame and $c_{k_l}$ and $c_k$, $o_{k_l}$ is the kth video frame in the output video stream after its pixels are visited $l$ times.

As shown above, the adaptive threshold value $T_l$ can be calculated as follows.

$$T_1 = T_0, \text{ where } T_0 \text{ is the initial threshold value} \qquad \text{Equation 9}$$

$$T_{l+1} = T_1 - \Delta E_{k_l}, \text{ if the trial change is accepted} \qquad \text{Equation 10}$$

$$T_{l+1} = T_l, \text{ if the trial change is not accepted or if no trial change can be made} \qquad \text{Equation 11}$$

In the exemplary embodiment, the method evaluates the effect of each trial change by calculating the change in the perceptual error of the halftone video frame due to the trial change. The exemplary embodiment is more computationally efficient over an alternative approach which includes, each time a trial change is made to a halftone video frame, recalculating the difference in the perceptual error of the originally generated halftone video frame and the perceptual error of the halftone video frame after a trial change.

In the embodiment as presented in FIG. 4, the metric $E_{oc,k} - E_{hc,k}$ only needs to be calculated once with each frame when the method visits the first pixel of the frame. When the method moves from a pixel X to the next pixel X+1, the method only needs to calculate $\Delta E_{k_l} = E_{oc,k_l} E_{oc,k_{l-1}}$, which is simple to calculate since the frame $o_{k_{l-1}}$ and the frame $o_{k_l}$ are different only in the pixel X+1.

In the above flowchart, the output video stream is processed beginning from the second frame to the last frame of the output video stream. When a frame X is under process, each round all pixels within the frame are checked one by one to test if a change to the pixel value may be made. If no pixel is changed within one round, the method moves to the next frame. In the exemplary embodiment, the pixels in the frame X are processed in a raster scanning order, i.e., beginning from top to bottom and from left to right. The pixels in a row Y are processed before pixels in a row immediately below the row Y. Within the row Y, a pixel Z is processed before the pixel next to the pixel Z on the right side. For each pixel of the frame X, it is determined whether a value of the pixel at the corresponding location in the frame immediately before the frame X may be copied and whether the perceptual error between the output video frame X and the continuous-tone video frame X still remains within a threshold with such a change. The change is kept if the perceptual error remains within the threshold.

In the exemplary embodiment, the pixels within a frame are processed according to the raster scanning order. It should be noted that the pixels may be processed in any other order. In the exemplary embodiment, the method moves to the next frame if no pixel is changed within one round in which all pixels of a frame are checked once. It should be noted that in another embodiment, the method moves to the next frame if the number of changes made within one round satisfies a certain criterion, e.g., if the changes made within one round are less than three times.

Figure 5:
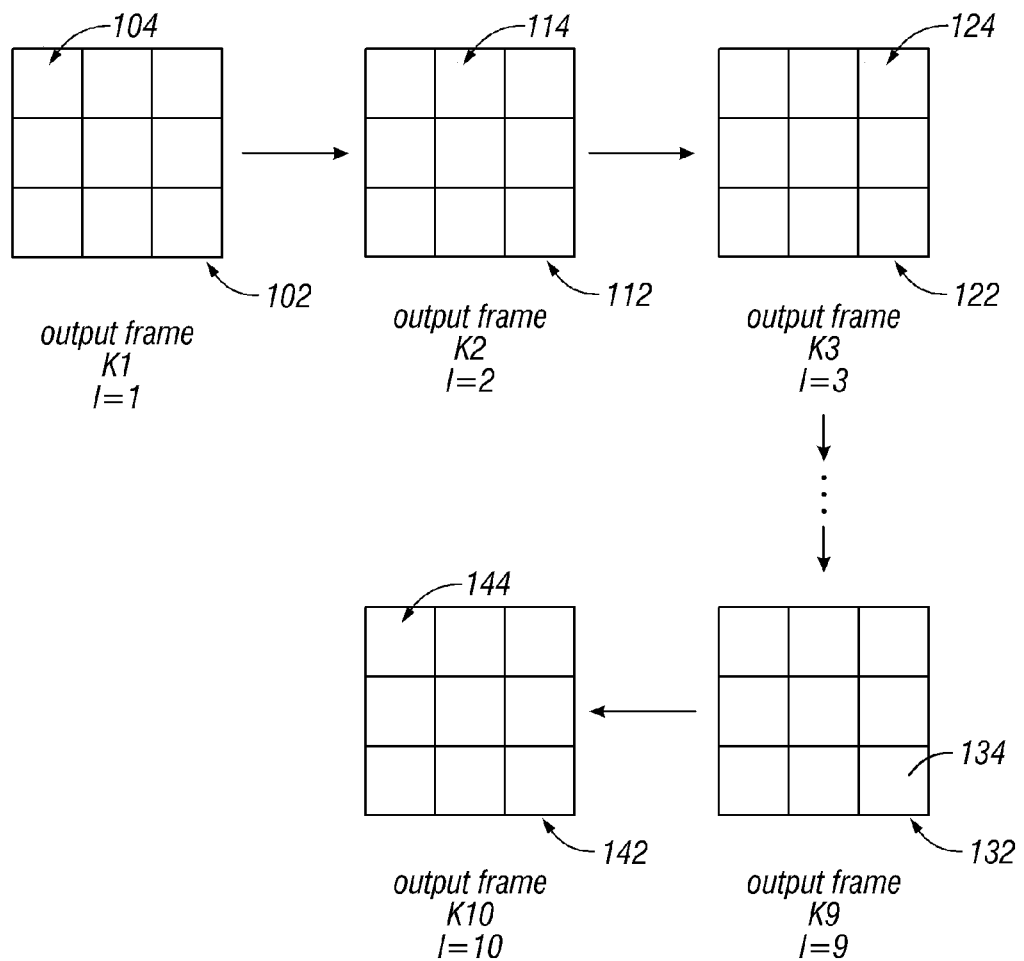
FIG. 5 is a diagram illustrating the process of visiting pixels in a frame.

FIG. 5 is a diagram illustrating the process of visiting pixels in a frame. Frames 102, 112, 122, 132, and 142 are used to represent different versions of the frame K in the output video stream.

In the example, the method starts to visit the first pixel, i.e., the pixel 104, of the frame 102 to check if a trial change to the pixel 104 should be made. The variable l is set as 1. The frame 102, which is also referred to as $K_1$, represents the frame K before the trial change is made.

The method then moves to the next pixel, i.e., the pixel 114. The frame 112, which is also referred to as $K_2$, represents the frame K after the processing of the pixel 104 is completed and before the trial change is made to the pixel 114.

The method then moves to the next pixel, i.e., the pixel 124. The frame 122, which is also referred to as $K_3$, represents the frame K after the processing of the pixel 114 is completed and before the trial change is made to the pixel 124.

This process continues until the method tests the last pixel in the frame K, i.e., the pixel 134 in the frame 132, i.e., the frame $K_9$. The variable l is increased to 9.

Depending on whether any test changes are accepted in this round visiting all pixels of the K frame, the method may continue to visit the first pixel of the K frame, i.e., the pixel 144 in the frame 142. The variable l is increased to 10. And the output K frame 142 is referred to as $K_{10}$.

Figure 6:
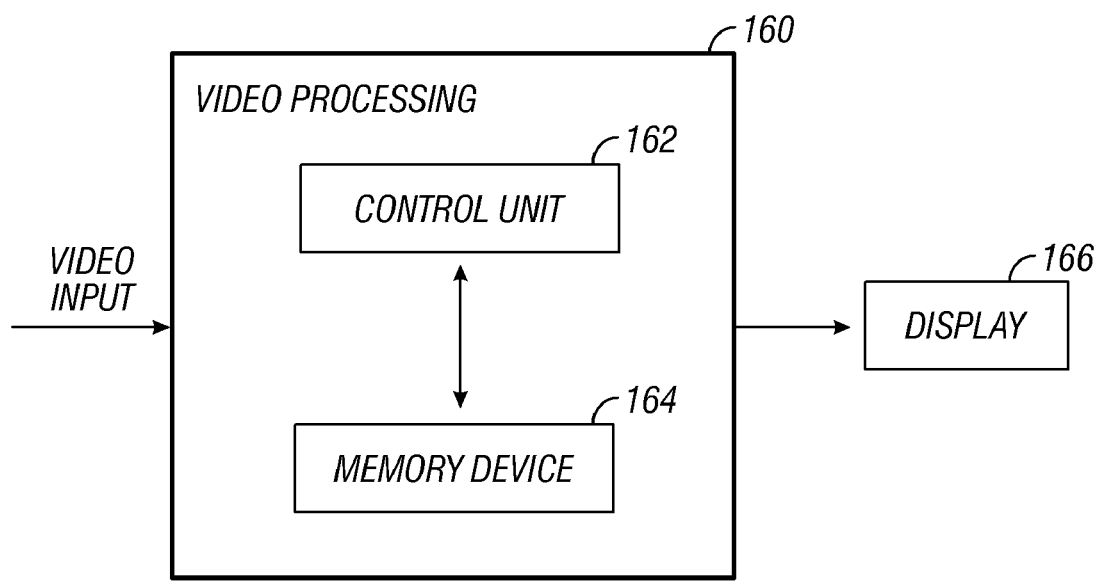
FIG. 6 is a block diagram illustrating one embodiment of an apparatus for processing video data.

FIG. 6 is a block diagram illustrating one embodiment of an apparatus for processing video data. In the exemplary embodiment, the apparatus 160 receives a continuous tone video stream as video input and then provides a processed video stream to a display 166. In another embodiment, the processed video stream as provided by the apparatus 160 may be subject to further video processing before being provided to the display 166.

In the exemplary embodiment, the apparatus 160 includes a memory device 164 which stores the continuous tone video stream and the corresponding halftone video stream as discussed above. The memory device 164 may also store other data and any software modules to be executed. The memory device 164 may be any type of storage media suitable for this purpose.

The apparatus 160 may further include a control unit 162 configured to communicate with the memory device and to perform the methods for processing video data as described above. In the exemplary embodiment, the control unit may be processor which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor may be configured to execute one or more software modules. In addition to executing an operating system, the processor may be configured to execute one or more software applications.

In the exemplary embodiment, the apparatus 160 receives the continuous tone video stream and generates halftone data for the continuous tone video stream as described above. In another embodiment, the apparatus 160 may receive both the continuous tone video stream and the corresponding halftone video stream. In one embodiment, the halftone video stream is generated by halftoning each frame of the continuous tone video stream independently.

The display 166 may be any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry).

In one embodiment, the display may be any binary display. In another embodiment, the display may be an interferometric modulator display. In an interferometric modulator display, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. These pixels can be configured to reflect predominantly at selected colors, allowing for a color display in addition to black and white.

In one embodiment of the interferometric modulator display, each pixel comprises a Microelectromechanical systems (MEMS) interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of processing video data, comprising: generating halftone data for a first video frame; generating halftone data for a second video frame; and to reduce at least one visual artifact, selectively copying the halftone data for the first video frame into the halftone data for the second video frame, the selectively copying being based upon a comparison between an adaptive threshold and the change resulting due to the copying of the data, in a human visual system model-based perceptual error of the halftone data for the second video frame; wherein the adaptive threshold is adapted in response to the selectively copying.

2. The method of claim 1, wherein selectively copying the generated halftone data further comprises:
   generating output data for the first frame, the output data for the first frame equal to the halftone data for the first frame;
   generating output data for the second frame, the output data for the second frame equal to the halftone data for the second frame; and
   to reduce at least one visual artifact, selectively copying the output data for the first video frame into the output data for the second video frame, the selectively copying being based upon a comparison between an adaptive threshold and the change, resulting due to the copying of the data, in the human visual system model-based perceptual error of the output data for the second video frame.

3. The method of claim 2, wherein selectively copying the output data comprises selectively copying a value of a pixel in the output data for the first video frame into the corresponding location in the output data for the second video frame, the selectively copying being based upon a comparison between an adaptive threshold and the change, resulting due to this copying of the data, in the human visual system model-based perceptual error of the output data for the second video frame.

4. The method of claim 3, wherein the pixel in the output data for the second video frame is located at a location corresponding to the location of the pixel in the output data for the first video frame.

5. The method of claim 3, wherein selectively copying a value of a pixel in the output data for the first video frame comprises scanning each pixel in the output data for the second video frame and selectively copying the pixel in the output data for the first video frame into a pixel in the output data for the second video frame, the selectively copying being based upon a comparison between an adaptive threshold and the change, resulting due to this copying of the data, in the human visual system model-based perceptual error of the output data for the second video frame.

6. The method of claim 5, wherein scanning each pixel in the output data for the second video frame and selectively copying the pixel in the output data for the first video frame is repeated until the number of copying made during a previous round of scanning meets a predetermined criterion.

7. The method of claim 6, wherein scanning each pixel in the output data for the second video frame and selectively copying of the pixel in the output data for the first video frame is repeated until no copying is made during a previous round of scanning.

8. The method of claim 5, wherein the pixels in the output data for the second video frame are processed in a raster scan order starting from top to bottom and from left to right.

9. The method of claim 1, wherein the visual artifact comprises flicker.

10. The method of claim 1, wherein the video data comprises a time sequence of video frames comprising the first and second video frame.

11. The method of claim 1, wherein the first video frame immediately precedes the second video frame.

12. The method of claim 1, wherein the first video frame is the next frame after the second video frame.

13. The method of claim 1, wherein selectively copying the generated halftone data further comprises selectively copying the halftone data for the first video frame into the halftone data for the second video frame based upon a comparison between an adaptive threshold and the change, resulting due to the copying of the data, in the human visual system model-based perceptual error of the halftone data for the second video frame, the adaptive threshold varying in response to previous modification made to the generated halftone data for the second video frame.

14. An apparatus for processing video data, comprising:
a memory device having stored therein at least halftone data for a first and second video frame; and
a processor that is configured to communicate with said memory device and is configured to reduce at least one visual artifact by selectively copying the halftone data for the first video frame into the halftone data for the second video frame, the selectively copying being based upon a comparison between an adaptive threshold and the change, resulting due to this copying of the data, in a human visual system model-based perceptual error of the halftone data for the second video frame.

15. An apparatus for processing video data, comprising:
means for generating halftone data for a first video frame;
means for generating halftone data for a second video frame;
and means for reducing at least one visual artifact by selectively copying the halftone data for the first video frame into the halftone data for the second video frame, the selectively copying being based upon a comparison between an adaptive threshold and the change, resulting due to the copying of the data, in a human visual system model-based perceptual error of the halftone data for the second video frame; wherein the adaptive threshold is adapted in response to the selectively copying.

16. The apparatus of claim 15, wherein the means for generating halftone data for a first video frame comprises a processor.

17. The apparatus of claim 15, wherein the means for generating halftone data for a second video frame comprises a processor.

18. The apparatus of claim 15, wherein the reducing means comprises a processor.

19. The apparatus of claim 15, wherein the video data comprises a time sequence of video frames comprising the first and second video frame.

20. The apparatus of claim 14, wherein the video data comprises a time sequence of video frames comprising the first and second video frame.

* * * * *